United States Patent Office 3,686,203
Patented Aug. 22, 1972

1

3,686,203
NITROIMIDAZOLES

Phillip Miller Somerset, and Carroll Sherman Montgomery, Piscataway, N.J., assignors to American Cyanamid Company, Stamford, Conn.

No Drawing. Filed May 28, 1969, Ser. No. 828,787
Int. Cl. C07d *49/36*
U.S. Cl. 260—309 5 Claims

ABSTRACT OF THE DISCLOSURE

The preparation of 1-loweralkyl-2-(2-phenyl-2-hydroxyethyl)-5-nitroimidazoles from the corresponding 2-methylimidazole by reaction with an aldehyde in the presence of a strong base catalyst, is described. These compounds are useful as intermediates in preparing other substituted imidazoles having antibacterial and antiparasitic activity.

SUMMARY OF THE INVENTION

This invention relates to novel 1-alkyl-2-substituted 5-nitroimidazoles. These compounds can be illustrated by the following formula:

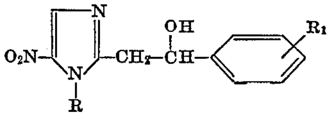

wherein R is lower alkyl and $R_1$ is selected from the group consisting of hydrogen, halogen, lower alkyl and lower alkoxy. In this application, the term lower alkyl and lower alkoxy is intended to include those having 1 to 6 carbon atoms and the term halogen is intended to include chlorine, bromine, iodine and fluorine.

The present compounds are pale yellow to white solids having relatively high melting points. They are somewhat soluble in lower alkyl alcohols and relatively insoluble in water.

The compounds of the present invention are prepared by reacting a 1-lower alkyl-2-methyl-5-nitroimidazole with an aromatic aldehyde in the presence of a strong base at comparatively low temperatures to produce the desired products in high yields. While the reaction can be carried out in solvents such as dimethylformamide or dimethylsulfoxide (aprotic solvents) or aromatic hydrogen solvents such as benzene, toluene, xylene and the like, it is preferably conducted in th e presence of lower alkyl alcohols.

Among the strong bases which are suitable in catalyzing the condensation are strong alkali metal hydroxides, such as sodium or potassium hydroxide; alkali or alkaline earth metal alkoxides, such as sodium ethoxide, potassium t-butoxide, sodium isopropoxide, potassium methoxide, and the like; metal amides, such as sodamide or potassium amide. The preferred base catalysts are the strong alkali metal hydroxides. The catalyst is used in an amount of from about 0.02 to 1.0 mole per mole of 1-alkyl-2-methyl-5-nitroimidazole, preferably from about 0.05 to 0.2 mole per mole of nitroimidazole.

Benzaldehyde is the preferred aromatic aldehyde in the condensation. However, other aromatic aldehydes or heterocyclic aldehydes are equally satisfactory. Included, for example, are 4-chlorobenzaldehyde, 2-methoxybenzaldehyde, 4-methylbenzaldehyde, 2-chlorobenzaldehyde, 4-fluorobenzaldehyde, 2-naphthaldehyde, p-nitrobenzaldehyde, furfural, and the like. The aldehyde is preferably used in stoichiometric excess over the 1-alkyl-2-methyl-5-nitroimidazole; however, slight excesses, i.e., from about 1–2 moles of aldehyde per mole of nitroimidazole, are especially preferred. The condensation, nonetheless, may be conducted using from about 1–8 moles of aldehyde per mole of nitroimidazole.

2

The temperature at which the condensation is conducted is somewhat critical. Temperatures of from about 15° C. to about 50° C. are operable, although it is preferred to conduct the condensation at about normal room temperature, i.e., about 25–30° C. At higher temperatures, i.e., higher than about 50° C., the condensation produces 2-(beta substituted vinyl) imidazole as described in U.S. Pat. 3,378,552. The reaction is conducted for about 2–5 hours, although the reaction time is not critical provided the base concentration and temperature are not high.

The compounds of the present invention are useful intermediates in the synthesis of highly active antibacterial and antiparasitic agents such as, for example, 2-(2-amino-5-thiadiazolyl)-1-methyl-5-nitroimidazole described by G. Berkelhammer and G. Asato, Science 162 page 1146 (1968.) The present process and the use of the present compounds to prepare 2 - (2 - amino - 5 - thiadiazolyl)-1-methyl-5-nitroimidazole is shown in the following flowsheet and described hereinafter in the examples.

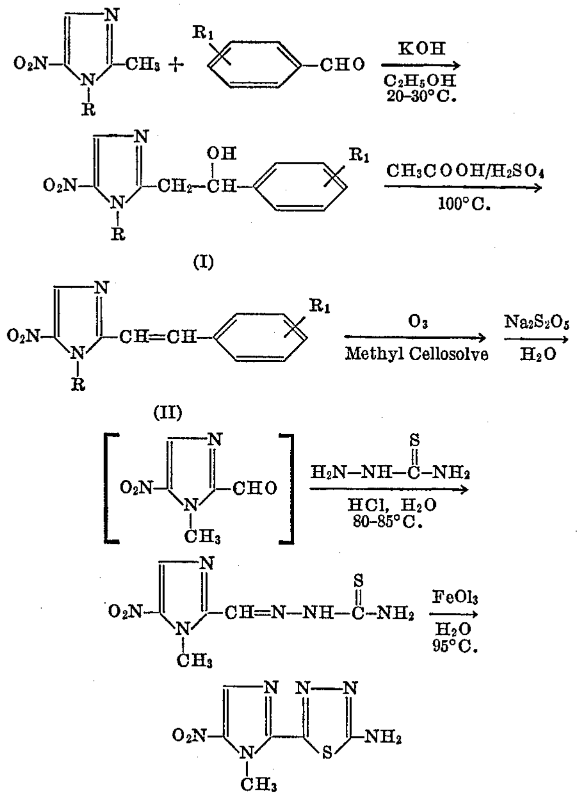

wherein R and $R_1$ are as defined hereinbefore.

SPECIFIC DISCLOSURE

The following examples describe the preparation of representative 1 - alkyl - 2 - substituted - 5 - nitroimidazoles and the use of these compounds to prepare highly active thiadiazolylnitroimidazoles.

EXAMPLE 1

Preparation of 1-methyl-2-(2-phenyl-2-hydroxyethyl)-5-nitroimidazoles

To a rapidly stirred suspension of 1,2 - dimethyl-5-nitroimidazole, 14.1 g., 0.1 mole, and benzaldehyde, 21.2 g., 0.2 mole, in 50 ml. ethanol is added 0.6 g., 0.011 mole of potassium hydroxide. The reaction mixture is stirred at about 25° C. for 2 hours. The thick, light yellow reaction mixture is diluted with 75 ml. of water and the yellow solid product filtered. The product is washed with 2× 10 ml. portions of ethanol and dried. There is obtained 21.5 g., 94% of theory, of pale yellow compound, melting point 175.1°–175.5° C.

EXAMPLE 2

Preparation of 1-methyl-2-(2-p-chlorophenyl-2-hydroxyethyl)-5-nitroimidazole

Following the procedure of Example 1 and substituting p-chlorobenzaldehyde for benzaldehyde, the above product is obtained and has a melting point of 163° C.–164° C.

EXAMPLE 3

Preparation of 1-methyl-2-(2-o-methoxyphenyl-2-hydroxyethyl)-5-nitroimidazole

Using the procedure of Example 1 and substituting o-methoxybenzaldehyde for benzaldehyde, the above product is obtained and has a melting point of 131°–132° C.

EXAMPLE 4

Preparation of 1-methyl-2-(2-p-methylphenyl-2-hydroxyethyl)-5-nitroimidazole

When the procedure of Example 1 is followed and p-methylbenzaldehyde is substituted for benzaldehyde, the above product is obtained and has a melting point of 162°–163° C.

EXAMPLE 5

Preparation of 1-methyl-2-(2-o-chlorophenyl-2-hydroxyethyl)-5-nitroimidazole

Following the procedure of Example 1 and substituting o-chlorobenzaldehyde for benzaldehyde, the desired compound is obtained having a melting point of 186°–187° C.

EXAMPLE 6

Preparation of 1-methyl-2-(2-p-fluorophenyl-2-hydroxymethyl)-5-nitroimidazole

When the procedure of Example 1 is followed and p-fluorobenzaldehyde is substituted for benzaldehyde, the above product is obtained, having a melting point of 158°–159° C.

EXAMPLE 7

Preparation of 1-methyl-2-(2-phenyl-2-hydroxyethyl)-5-nitroimidazole

To a 750 gal. kettle is charged:

(1) 1,095 lb. ethanol
(2) 30 lb. potassium hydroxide (flake, 90%)
(3) 400 lb. 1,2-dimethyl-5-nitroimidazole
(4) 329 lb. benzaldehyde The resulting slurry is stirred at 25–35° C. for 3 hours, filtered on a centrifuge and the cake washed with 450 lb. ethanol. After drying at 55°–60° C., the product weighed 623 lb. (89% of theory), melting point 175°–176° C.

EXAMPLE 8

Preparation of 1-methyl-5-nitro-2-styrylimidazole

To a 750 gal. kettle is charged:

(1) 1039 lb. glacial acetic acid
(2) 451 lb. 98% sulfuric acid
(3) 618 lb. 1 - methyl - 2 - (2 - phenyl - 2 - hydroxyethyl)-5-nitroimidazole (Kettle is cooled during charging to control temperature below 40° C.) The resulting slurry is then heated to 105° C. and stirred at 105°–110° C. for 3 hours. The batch is then cooled to 50°–60° C. and drowned in a slurry of 1775 lb. flake ice and 2000 lb. treated water, keeping the temperature below 20°–25° C. during the drowning. The resultant slurry is stirred 1 hour at 20°–25° C., and filtered on a centrifuge. The cake is washed with treated water until the washings are neutral. The cake is then washed with 600 lb. ethanol and spun dry. After drying at 70°–75° C., the product weighs 535 lb. (93% of theory), melting point 199–202° C.

EXAMPLE 9

Preparation of 1-methyl-2-(2-phenyl-2-hydroxyethyl)-5-nitroimidazole

A solution of 1.8 g. (0.032 mole) of potassium hydroxide in 150 ml. of ethanol is stirred at about 25° C. as 42.3 g. (0.30 mole) of 1,2-dimethyl-5-nitroimidazole and 63.6 g. (0.60 mole) of benzaldehyde are added rapidly. The mixture is stirred for about 3 hours, the resulting precipitate filtered, washed with ethanol and dried. There is obtained 65.4 g. of yellow product, melting point 172°–176.5° C.

EXAMPLE 10

Preparation of 1-methyl-5-nitro-2-imidazolecarboxaldehyde thiosemicarbazone

A mixture of 22.9 g. (0.1 mole) of 1-methyl-5-nitro-2-styrylimidazole, (Example 8) and 175 ml. methanol is cooled to 0.5° C. and ozonized for a period of about 70 minutes. The resulting turbid yellow solution is stirred as 9.5 g. (0.05 mole) of sodium metabisulfite in 175 ml. water is added drop-wise over a period of about 30 minutes. The temperature increased during the addition to about 40°–45° C. To this solution at about 40° C. is added 23 ml. (9 g., 0.27 mole) of hydrochloric acid and 9.6 g. (0.1 mole) of thiosemicarbazide. On heating to 80° C. a yellow precipitate formed which is stirred at 80° C. for about 2 hours. The mixture is then cooled to 20°–25° C., the precipitate filtered, washed with 580 ml. water until the filtrate is neutral, then with 125 ml. ethanol and dried. There is obtained 16.5 g. (72%), melting point 228°–232.5° C.

EXAMPLE 11

Preparation of 2-(2-amino-5-thiadiazolyl)-1-methyl-5-nitroimidazole

The 1-methyl - 5 - nitro - 2 - imidazolecarboxaldehyde thiosemicarbazone is added to a solution of 42.7 g. (0.158 mole) of ferric chloride hexahydrate in 207 ml. water and heated at 95° C. for 6 hours. The mixture is cooled to 0–5° C. and the solid material filtered, washed with 180 ml. water and dried. There is obtained 8.1 g. (91%) of product, melting point 263°–265° C. having a purity of 97.9%.

We claim:

1. A nitroimidazole of the formula:

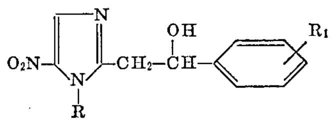

wherein R is lower alkyl and $R_1$ is selected from the group consisting of halogen and lower alkoxy.

2. The 5-nitroimidazole in accordance with claim 1: 1 - methyl - 2 - (2 - p - chlorophenyl - 2 - hydroxyethyl)-5-nitroimidazole.

3. The 5-nitroimidazole in accordance with claim 1: 1-methyl - 2 - (2-o-methoxyphenyl - 2 - hydroxyethyl)-5-nitroimidazole.

4. The 5-nitroimidazole in accordance with claim 1: 1-methyl - 2 - (2-o-chlorophenyl - 2 - hydroxyethyl)-5-nitroimidazole.

5. The 5-nitroimidazole in accordance with claim 1: 1 - methyl - 2 - (2-p-fluorophenyl - 2 - hydroxyethyl)-5-nitroimidazole.

References Cited

UNITED STATES PATENTS

| | | | |
|---|---|---|---|
| 3,280,139 | 10/1966 | Klosa | 260—309 |
| 3,378,552 | 4/1968 | Henry | 260—309 |
| 3,450,710 | 6/1969 | Verdi | 260—309 |
| 3,458,528 | 7/1969 | Gal | 260—309 |

OTHER REFERENCES

Lawson: J. Amer. Chem. Soc., vol. 75, pp. 3398–4000 (1953).

Netherlands application 6609553, January 1967, pp. 1–10, 36–40, and drawing (1 page) relied upon.

NATALIE TROUSOF, Primary Examiner

U.S. Cl. X.R.

260—240 A, 306.8 D, 999